United States Patent [19]

Suminoe et al.

[11] 4,211,682

[45] Jul. 8, 1980

[54] DENTAL HYDRAULIC INVESTMENT

[75] Inventors: Taro Suminoe, Tokyo; Tetsuo Ito, Machida; Eiichi Masuhara, Tokyo, all of Japan

[73] Assignee: Japan Synthetic Rubber Co., Ltd., Tokyo, Japan

[21] Appl. No.: 885,129

[22] Filed: Mar. 10, 1978

[30] Foreign Application Priority Data

Mar. 18, 1977 [JP] Japan .................................. 52-29994

[51] Int. Cl.² .............................................. C08L 61/10
[52] U.S. Cl. ...................... 260/29.3; 106/35; 260/29.4 UA; 260/29.6 NR; 260/29.6 MM; 428/524
[58] Field of Search ...... 260/29.3, 29.4 UA, 29.6 NR, 260/29.6 MM, 29.6 S, 38, 39 R, 844, 851; 106/35, 38.22; 264/17

[56] References Cited

U.S. PATENT DOCUMENTS 3,915,919  10/1975  Nishioka et al. ................ 260/29.6 S

OTHER PUBLICATIONS

The Journal of Dental Engineering No. 17 (1971), pp. 4–13.
Journal of Prosthet. Dent. vol. 30, No. 3, Sep. 1973, pp. 339–346.
Japanese Patent Publication No. 30587/76, 1976, pp. 145–147.

*Primary Examiner*—Theodore E. Pertilla
*Attorney, Agent, or Firm*—Oblon, Fisher, Spivak, McClelland & Maier

[57] ABSTRACT

A dental hydraulic investment comprising (A) an aqueous polyvinyl alcohol solution, (B) a water-soluble metallic compound, (C) a water-soluble, thermosetting resin precondensate and (D) a filler. Use of this investment allows formation of a desired denture by either a thermal polymerization or a room temperature polymerization method, and the denture thus obtained has excellent surface luster and is high in dimensional accuracy.

31 Claims, 1 Drawing Figure

U.S. Patent        Jul. 8, 1980        4,211,682
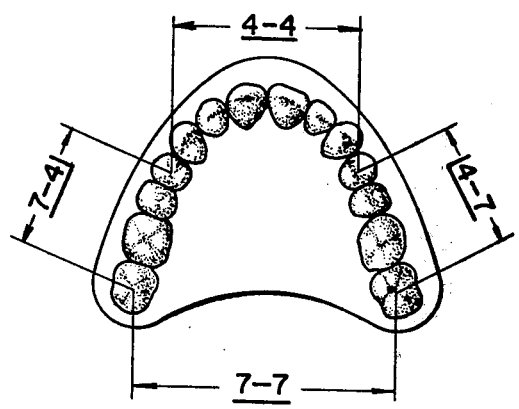

DENTAL HYDRAULIC INVESTMENT

This invention relates to a dental hydraulic investment to be used in forming a denture mold for making a resin denture. More particularly, this invention relates to the use of a hydrous polyvinyl alcohol composition as dental hydraulic investment.

Generally, a resin denture is fabricated by first forming a wax denture model in which the artificial teeth are embeded, then investing this denture model with an investing material to form a mold and polymerizing the resin denture base material in the mold. In case gypsum is used as investment, a doughlike resin material composed of a mixture of monomeric methyl methacrylate and a homopolymer thereof is pressed into said mold and subjected to thermal polymerization therein. In the case of using a hydrocolloid investing material such as agar-agar, a fluid resin material which is polymerizable at room temperature is poured into the mold and polymerized at room temperature (The Journal of Dental Engineering No. 17 (1971) p. 4).

The conventional method of making a denture by thermally polymerizing a resin material in a mold formed by using a gypsum investment involves the following problems:

(1) Since the monomer is absorbed into the mold made of gypsum investment in the early stage of polymerization of the resin material, the formed denture base surface is rather poor in luster and the subsequent denture processing requires a great deal of time and labor.

(2) Much difficulty attends the removal of the completed resin denture from the mold made of the gypsum investment, and the resin denture may suffer damage during the removal.

(3) Separation of the denture from the gypsum investment mold is awkward, and it needs to apply a releasing agent to the gypsum investment mold with utmost care so as to prevent the gypsum from getting in and lodging between the artificial teeth.

(4) The resin denture made by thermal polymerization of the resin material in a gypsum investment mold is poor in fitting at the palate.

On the other hand, the method of making a resin denture by room temperature polymerization of a resin material in a mold made of an agar-agar investment possesses the following disadvantages:

(1) Much time is required for the process for melting the agar-agar under heat and then embedding and hardening therein a wax denture model.

(2) There are certain limitations on the model investing temperature as well as the resin material pour and polymerization temperatures because a mold is made of the agar-agar investment based on a wax denture model. More specifically, (a) it needs to accomplish the investing at a temperature within the range of approximately 50° to 55° C., at which the wax does not melt and the agar-agar does not begin to gel, and (b) since agar-agar is again melted when heated, heating above 50° C. is not permitted for the polymerization of the resin material.

(3) The agar-agar investment is weak in retention of the artificial teeth, so that the positional deviation of the artificial teeth or leakage of fluid resin onto the occlusal surface of the artificial teeth occur.

(4) When making a mold with the agar-agar investment, it is impossible to melt the wax denture model in hot water and hence said denture model is taken as it is out of the mold, so that it needs to re-plant the artificial teeth, but such re-planting requires a great deal of skill and there is much likelihood of positional change of the planted teeth.

(5) As the matter of course, agar-agar cannot be used as an investment for the thermal polymerization of the doughlike resin.

The present inventors have conducted extensive research for obtaining an excellent investing material which is free of the said defects inherent to the conventional investments, namely, an investing material for use in making resin dentures, which is inexpensive, capable of providing a denture having extremely high dimensional precision and a good luster of the denture base, and also easy to work with, and as a result, have found that a hydrous polyvinyl alcohol composition is very effective for said investment.

An object of this invention, therefore, is to provide a dental hydraulic investing material which is easy to work in the denture processing.

Another object of this invention is to provide a dental hydraulic investing material with which it is possible to make a denture having very excellent dimensional precision and luster of denture base.

The other objects and advantages of this invention will become apparent from the following description.

According to the present invention, there is provided a dental hydraulic investment comprising (A) an aqueous polyvinyl alcohol solution, (B) a water-soluble metallic compound, (C) a water-soluble, thermosetting resin precondensate and (D) a filler. Use of this investment results in an easy working and enables the production of resin dentures with excellent luster and high dimensional precision.

The polyvinyl alcohol (hereinafter referred to as PVA) used in this invention may be of any known type, though the degree of saponification of PVA is preferably 50 to 100%, more preferably 70 to 100%, in view of easy handling, easy dissolution and easy obtaining, and the degree of polymerization of PVA is preferably not less than 200, more preferably 200 to 2,000, in view of easy curing of the investing material and easy obtaining. The concentration of the aqueous PVA solution for use in this invention is preferably 5 to 50% by weight.

The water-soluble metallic compounds usable in this invention include not only water-soluble compounds per se but also compounds which can be water-solubilized with an acid or alkali, such as sulfates, acetates, nitrates, halides, hydroxides, oxides and the like of metals of Groups Ib, IIa, IIb, IIIa, IVa, IVb, Vb, VIb, VIIb and VIII of the Periodic Table.

Specific examples of such compounds are copper sulfate, copper acetate, copper nitrate, copper chloride, etc. for the Group Ib metal compound; beryllium sulfate, beryllium chloride, magnesium acetate, calcium acetate, strontium nitrate, etc. for the IIa metal compound; zinc acetate, mercuric acetate, etc. for the Group IIb metal compounds; aluminum chloride, aluminum sulfate, etc. for the Group IIIa metal compound; stannous chloride, stannic chloride, lead acetate, etc. for the Group IVa metal compound; titanium sulfate, zirconium oxychloride, etc. for the Group IVb metal compound; vanadium trichloride, vanadium pentoxide, niobium chloride, etc. for the Group Vb metal compound; chromous chloride, potassium perchromate, molybdenum oxide, etc. for the Group VIb metal compound; manganese oxide, etc. for the Group VIIb metal compound; and ferrous chloride, ferric chloride, ferric nitrate, cobaltous sulfate, cobalt acetate, nickel chloride, nickel acetate, etc. for the Group VIII metal compound. The preferred examples among these water-soluble metallic compounds are copper acetate, aluminum chloride, aluminum sulfate, stannic chloride, titanium sulfate, molybdenum oxide, ferric chloride and potassium perchromate. These compounds may be used alone or in admixture of two or more. Aluminum chloride is the most preferable example, because when it is used it is easy to control the strength of the resulting mold and the crosslinking rate.

The amount of the metallic compound in the investment of this invention is preferably one metal atom per 2 to 1,000 hydroxy groups, more preferably 10 to 500 hydroxy groups, of PVA. Any larger amount provides no better effect, while any smaller amount results in retarded curing of the investing material.

The thermosetting resin precondensate to be mixed with PVA in this invention is soluble in water and preferably selected from the group consisting of the reaction products of melamine and formaldehyde, reaction products of urea and formaldehyde, reaction products of phenol and formaldehyde and derivatives thereof. The ratio of melamine, urea or phenol to formaldehyde in said reaction products is preferably ⅔ to 1/20 (molar ratio), which is commonly employed in this type of reactions. The recommended reaction conditions are at 50° to 100° C. for a period of 1/12 to 4 hours.

The preferred amount of the thermosetting resin precondensate used in this invention is preferably within the range of 10 to 1,000 parts by weight, more preferably 10 to 500 parts by weight, per 100 parts by weight of PVA.

The filler used in this invention may be either a powdery filler such as aluminum hydroxide, calcium hydroxide, aluminum sulfate, barium sulfate, silica, magnesium silicate, aluminum silicate, calcium silicate, magnesium oxide, titanium oxide, zinc oxide, alumina white, silica-alumina, talc, clay, glass, quartz, etc., or a fibrous filler such as cotton, flax, hemp, ramie, jute, wool, rayon, acetate fiber, polyamide fiber, polyvinyl alcohol fiber, polyvinylidene chloride fiber, polyacrylonitrile fiber, polyester fiber, polyethylene fiber, polypropylene fiber, glass fiber, etc.

Preferred examples of powdery filler are silica; silicates such as aluminum silicate, magnesium silicate and calcium silicate; talc; and titanium oxide, and more preferable are silica and silicates.

Such a powdery filler is in the form of fine powder having an average particle size of preferably not more than $50\mu$, more preferably not more than $5\mu$, and the fibrous filler has a length of preferably not more than 5 cm, more preferably not more than 2 cm, and a thickness of preferably not more than $150\mu$, more preferably not more than $50\mu$. These fillers may be used alone or in admixture of two or more.

The amount of the filler used in the investing material of this invention is preferably within the range of 20 to 500 parts by weight per 100 parts by weight of PVA. A smaller amount results in too low a solution viscosity of the investing material before curing, while a larger amount invites too high a solution viscosity, resulting in poor workability. Addition of such a filler brings about a substantial improvement of workability and dimensional precision of the denture. Particularly, when both powdery filler and fibrous filler are used together, a tougher mold can be obtained from the investment. It is, of course, possible to add, if desired, a variety of additives such as colorant, plasticizer, stabilizer, antifoaming agent, etc.

In the preparation of the investing material of this invention, there is no particular restriction. However, in order to obtain a uniform mixture, it is preferable to mix the aqueous solution of PVA (A) with the water-soluble metallic compound (B) in the form of an aqueous solution, the water-soluble thermosetting resin precondensate (C) in the form of an aqueous solution and the filler (D). However, upon mixing two of the (A), (B) and (C) components crosslinking begins to take place at room temperature, and therefore, it is preferable to mix all the components (A), (B), (C) and (D) at the time of use. However, when aluminum chloride is used as the water-soluble metallic compound (B), a mixture of the aqueous solution of PVA and an aqueous aluminum chloride solution is not crosslinked at room temperature. Therefore, it is most preferable to previously prepare a dispersion (I) by mixing the aqueous solution of PVA, an aqueous aluminum chloride solution and a part of the filler (D), and separately a dispersion (II) by mixing the aqueous solution of the water-soluble thermosetting resin precondensate (C) with the remaining part of the filler (D), and mixing the dispersion (I) with the dispersion (II) at the time of use. The amount of the filler (D) in the dispersion (I) or (II) is adjusted so that the viscosity of the dispersion (I) becomes substantially the same as that of the dispersion (II).

The investing material according to this invention comprises (A) an aqueous PVA solution, (B) a water-soluble metallic compound, (C) a water-soluble thermosetting resin precondensate and (D) a filler, and it is possible to easily adjust the curing time, hardness, water content and crosslinking density of the investing material by properly changing the amounts of the respective constituents and the ambient temperature and moisture during the curing treatment.

If desired, the curing time of the investing material can be shortened by heating or other means. This can eliminate the cumber-someness as experienced when using agar-agar in the said conventional room temperature polymerization method and allows formation of a mold for the desired resin denture in a short time. In the case of using agar-agar as an investment, a period of approximately two hours is needed as a preparation period for investing the wax denture model, but in the case of the investing material according to this invention, no such preparation period is required and the mixture can be immediately used as an investment.

In the mold formed with the investing material of this invention, a conventional resin material may be polymerized by either thermal polymerization or room temperature polymerization, and when the completed resin denture is taken out after polymerization of the dough-like or fluid resin material in said mold, this mold can be easily broken by hand. Therefore, removal of the completed resin denture is easy and not attended by any risk of damage to the resin denture as often experienced when using a mold formed with gypsum investment in the thermal polymerization method.

It is another prominent feature of the investing material of this invention that it does not absorb the monomer in the resin material unlike the gypsum investment, so that excellent luster is provided on the denture base surface, allowing easy finish of the denture base with simple polishing.

Also, in the case of using a gypsum investment, it is necessary to use a releasing agent to prevent adhesion of the mold to the resin denture base, but use of the investing medium of this invention can dispense with application of any releasing agent because the investment can be easily separated from the denture base.

It is possible to make a mold by investing the entirety of the wax denture model with the investing material of this invention, but it is also recommended to employ the techniques of first thickly investing the surface of the wax denture model with the investing material of this invention and then further covering it with gypsum, or first investing the wax denture model surface with the investing material of this invention in a filmy form and then further applying gypsum thereover, because these techniques enable the production of a resin denture with even higher dimensional precision and better surface luster.

As the investing material of this invention can be treated at room temperature and it also cures at room temperature, there is no likelihood of deformation or dislocation of the wax denture model due to heat during the investing of the wax denture model. Moreover, the investing material of this invention is stable against heat as curing of the investing material is effected by a cross-linking reaction which brings about uniform crosslinking even in the inside of the investment and hence the investment does not melt even when hot water is applied thereto. Thus, it is possible to remove the wax of the wax denture model while securely maintaining the artificial teeth in the investment mold by heating the investment after it has set. This is unfeasible with the conventional agar-agar investment. It will be appreciated that an outstanding feature of this invention resides in the fact that the investing material according to this invention provides a great benefit to the art by saliently improving the working efficiency as well as the dimensional precision of the resin dentures.

The accompanying drawing illustrates the maxillary measuring sections for examining the dimensional changes of the horizontal positions of the artificial teeth in a resin denture.

The present invention is now described in further detail by showing some particular embodiments thereof in the following Examples, but it will be understood that the Examples are merely by way of illustration and not by way of limitation. In the Examples, percentages are by weight unless otherwise specified.

COMPARATIVE EXAMPLE 1

A wax denture model formed on a gypsum-made stone cast was set in a denture flask together with the stone cast in the usual manner. In order to make removal of the formed resin denture as easy as possible, an aqueous solution of gypsum was poured into the denture flask in two portions. The second pour of the gypsum solution was performed after the first portion of gypsum had set, with the interface being coated with vaseline before the second pour. After the gypsum investment had set sufficiently, the denture flask was dipped in boiling water for 5 minutes to soften the wax. Then the denture flask was divided and the wax was removed. The wax remaining on both gypsum-made mold and gypsum-made stone cast was rinsed away with hot water. This was followed by quick removal of moisture and application of a releasing agent while said both gypsum mold and stone cast were still hot. As the wax of the denture model is melted away, meticulous attention is required to the application of the releasing agent on the gypsum mold so as to prevent deposition of the wax on the artificial teeth held in the gypsum mold and to also avoid deficient application between the teeth. Then the dough-like resin material (prepared by mixing 20 g of polymethyl methacrylate in the form of beads (average particle size: 0.2 mm; average degree of polymerization: 8,000) and 8.6 cc of monomeric methyl methacrylate, and aging the mixture in a sealed vessel at room temperature (25° C.) for 20 to 30 minutes) was subjected to trial closure two to three times in both gypsum mold and gypsum stone cast, and after trimming off the resin flash, the entire flask was held by the flask clamps, followed by polymerization at 60° C. for 1 hour and then at 100° C. for 30 minutes. Removal of the resin denture from the gypsum mold was not easy although gypsum was poured in two portions. Gypsum had gotten in between the teeth and much time was required for finishing work such as polishing.

For determining the dimensional precision, (1) clearance between the denture base and the stone cast, (2) change in horizontal position of the artificial teeth, (3) change in height of the artificial teeth and (4) change in vertical dimension of occlusion, all are measured in comparison with the wax denture model. (As for change in horizontal position of the artificial teeth, such a change was measured at each of the measuring sections shown in the accompanying drawing). The results are shown in Tables 1 and 2.

EXAMPLE 1

A wax denture model formed in the same way as in Comparative Example 1 was set in a denture flask in the same manner as in Comparative Example 1, and then a mixed solution prepared by stirring under vacuum 67 g of a 30% aqueous solution of PVA (saponification degree: 87%; polymerization degree: 500), 25 g of a 80% aqueous solution (pH 8.6–9.5) of a melamine-formaldehyde reaction product (synthesized by suspending melamine in formalin in a ratio of 3 moles of formaldehyde per mole of melamine and heating at 80° C. for 20 minutes) as a thermosetting resin precondensate, 11 g of a 50% aqueous solution of aluminum chloride hexahydrate, 20 g of pulverized silica (80% of particles having a particle size of $5\mu$ or less and 62% of particles having a particle size of $2\mu$ or less), and 0.5 g of a silicon-based antifoaming agent (moldified silicone emulsion having specific gravity of 1.013) in a stirring apparatus so that no air bubbles were contained, was coated in a thickness of 5 mm on the wax denture model surface. The mixed solution started to harden in about 15 minutes at 25° C., and when it became non-fluid, gypsum was poured thereon to complete the investment. After the gypsum had been hardened the flask was immersed in boiling water for 5 minutes to soften the wax, and then the denture flask was divided and the wax was removed. The wax remaining on the mold made of the investment according to this invention and the gypsum-made stone cast was rinsed away with hot water. The separating medium had only to be applied on the gypsum stone cast, and no specific care was required for such application. Polymerization of the doughlike resin was effected in the same way as in Comparative Example 1. Removal of the completed resin denture after the polymerization was easy, and also the denture base surface had excellent luster and polishing was finished in a short time.

The results of measurements of dimension of denture are shown in Tables 1 and 2.

EXAMPLE 2

A wax denture model prepared in the same way as in Comparative Example 1 was set in a denture flask in the same manner as in Comparative Example 1, and then a mixed solution prepared by stirring under vacuum 67 g of a 30% aqueous solution of PVA (with saponification degree of 87% and polymerization degree of 500), 25 g of a 80% aqueous solution (pH 8.6–9.5) of the same melamine-formaldehyde reaction product as in Example 1, 11 g of a 50% aqueous solution of aluminum chloride hexahydrate, 30 g of talc with an average particle size of 1μ and 0.5 g of the same silicon-based antiforming agent as in Example 1, in a stirring apparatus so that no air bubbles were contained, was coated in a thickness of 5 mm on the wax denture model surface. The mixed solution started to harden in about 15 minutes at 25° C., and when it became non-fluid, gypsum was further poured thereon to complete the investment.

Rinse-off of the wax and subsequent operation were effected in the same manner as in Example 1 to obtain a resin denture. No difficulty attended the removal of the completed resin denture after the polymerization, and the denture base surface had excellent luster and polishing could be finished in a short time.

The results of measurements of dimension of denture are shown in Tables 1 and 2.

EXAMPLE 3

A wax denture model made in the same manner as in Comparative Example 1 was set in a denture flask. Then 12.5 g of a 80% aqueous solution of the same melamine-formaldehyde reaction product as in Example 1, 20 g of the same pulverized silica as in Example 1, and 0.5 g of the same silicon-based antifoaming agent as in Example 1 were added to 67 g of a 30% aqueous solution of PVA (saponification degree: 87%; polymerization degree: 500), and after sufficient agitation, to this mixed solution was further added 1.6 g of a 25% aqueous solution of titanium sulfate and stirred under vacuum in a stirring apparatus with care so that no air bubbles were contained, and the resulting mixed solution was coated in a thickness of 5 mm on the wax denture model surface. When the mixed solution started to harden and became non-fluid, gypsum was poured thereon to complete the investment.

Wax rinse-off and subsequent operation were effected in the same manner as in Example 1 to obtain a resin denture. Removal of the completed resin denture after the resin polymerization was attended with no difficulty, and the denture base surface had excellent luster and polishing could be finished in a short time.

The results of measurements of dimension of denture are shown in Tables 1 and 2.

Table 1

| | Degree of change in position of artificial teeth (Unit: mm) | | | |
| --- | --- | --- | --- | --- |
| | Change in horizontal position | | | |
| | 4–4 | 7–7 | 7–4 | 4–7 |
| Comparative Example 1 | −0.42 | −0.5 | −0.23 | −0.20 |
| Example 1 | −0.06 | −0.09 | −0.04 | −0.06 |
| Example 2 | −0.19 | −0.22 | −0.16 | −0.10 |
| Example 3 | −0.06 | −0.08 | −0.08 | −0.05 |

Note:
The values in the columns "4–4", "7–7", "7–4" and "4–7" refer to differences of the distances between teeth in the denture shown in the drawings from those in the wax denture model.

Table 2

| | Dimension of denture (Unit: mm) | | | | | |
| --- | --- | --- | --- | --- | --- | --- |
| | Change in height of artificial teeth | | Vertical dimension of occlusion | Clearance between denture base and stone cast | | |
| | Maxillary | Mandibular | | Palata middle | Ridge portion | Gingivobuccal hold |
| Compartive Example 1 | +0.42 | +0.29 | 1.52 | 1.05 | 0.76 | 0.20 |
| Example 1 | +0.03 | +0.03 | 0.08 | 0.00 | 0.00 | 0.00 |
| Example 2 | +0.09 | +0.11 | 0.13 | 0.20 | 0.05 | 0.00 |
| Example 3 | +0.03 | +0.04 | 0.08 | 0.13 | 0.00 | 0.00 |

Notes:
1. The above values show comparisons with wax denture model.
2. All the measurements were made according to the method described in the Journal of Dental Engineering, No. 17, pp. 10–13 (1975).
3. "−" indicates shrinkage and "+" indicates expansion.
4. Vertical dimension of occlusion was determined by measuring the amount of float-up of the incisal pin by using a balanced articulator.

EXAMPLE 4

The same PVA solution as in Example 1 was mixed with the same aluminum chloride solution as in Example 1 in the same proportion as in Example 1 together with 10 g of the same silica particles as in Example 1. Separately, 25 g of the same melamine-formaldehyde reaction product solution as in Example 1 was mixed with 10 g of the same silica particles and the same antifoaming agent as in Example 1. The resulting two dispersions were mixed and applied to the wax denture model prepared in the same manner as in Comparative Example 1 in the same manner as in Example 1. The same subsequent procedure as in Example 1 was repeated to obtain a resin denture. The dimensions of the resin denture were measured to obtain the results shown in Tables 3 and 4.

EXAMPLE 5

An experiment was made in the same manner as in Example 1, except that 30 g of zinc oxide powder (average particle size: 0.2–0.8μ) was substituted for the 20 g of pulverized silica. The results obtained are shown in Tables 3 and 4.

EXAMPLE 6

An experiment was carried out in the same manner as in Example 1, except that 20 g of clay (80% of particles having a particle size of 5μ or less and 55% of particles having a particle size of 2μ or less) was substituted for the 20 g of pulverized silica. The results obtained are shown in Tables 3 and 4.

EXAMPLE 7

An experiment was made in the same manner as in Example 1, except that 10 g of polyvinyl alcohol fiber (6×0.12 mm) was substituted for the 20 g of pulverized silca. The results obtained are shown in Tables 3 and 4.

Table 3

| | Degree of change in position of artificial teeth (Unit: mm) | | | |
|---|---|---|---|---|
| | 4-4 | 7-7 | 7-4 | 4-7 |
| Example 4 | −0.08 | −0.06 | −0.06 | −0.04 |
| Example 5 | −0.08 | −0.10 | −0.03 | −0.06 |
| Example 6 | −0.10 | −0.07 | −0.07 | −0.06 |
| Example 7 | −0.14 | −0.12 | −0.12 | −0.08 |

Table 4

| | Dimension of denture (unit: mm) | | | | | |
|---|---|---|---|---|---|---|
| | Change in height of artificial teeth | | Vertical dimension of occlusion | Clearance between denture base and stone cast | | |
| | Maxillary | Mandibular | | Palatal middle | Ridge portion | Gingivobuccal hold |
| Example 4 | +0.08 | +0.02 | 0.16 | 0.06 | 0.04 | 0.00 |
| Example 5 | +0.08 | +0.04 | 0.14 | 0.12 | 0.00 | 0.00 |
| Example 6 | +0.10 | +0.06 | 0.18 | 0.14 | 0.02 | 0.00 |
| Example 7 | +0.12 | +0.04 | 0.22 | 0.18 | 0.04 | 0.00 |

EXAMPLE 8

The same procedure as in Example 1 was repeated, except that 5 g of a 50% aqueous solution of stannic chloride pentahydrate was substituted for the 11 g of 50% aqueous aluminum chloride solution. The results obtained are shown in Tables 5 and 6.

EXAMPLE 9

The same procedure as in Example 1 was repeated, except that 15 g of a 5% aqueous solution of cupric acetate monohydrate was substituted for the 11 g of 50% aqueous aluminum chloride solution and the 20 g of silica particles were replaced by 30 g of the same silica particles. The results obtained are shown in Tables 5 and 6.

EXAMPLE 10

The same procedure as in Example 1 was repeated, except that 10 g of a 20% aqueous solution of beryllium chloride tetrahydrate was subjected for the 11 g of 50% aqueous aluminum chloride solution and 25 g of a 85% aqueous solution of a urea-formaldehyde reaction product (synthesized by heating 3 moles of formaldehyde and 1 mole of urea at 70° C. for one hour) was substituted for the 25 g of 80% aqueous solution of melamine-formaldehyde reaction product. The results obtained are shown in Tables 5 and 6.

EXAMPLE 11

The same procedure as in Example 1 was repeated, except that 3 g of a 66.6% aqueous solution of ferric chloride hexahydrate was substituted for the 11 g of 50% aqueous aluminum chloride solution. The results obtained are shown in Tables 5 and 6.

Table 5

| | Degree of change in position of artificial teeth (Unit: mm) | | | |
|---|---|---|---|---|
| | 4-4 | 7-7 | 7-4 | 4-7 |
| Example 8 | −0.02 | −0.03 | −0.03 | −0.04 |
| Example 9 | −0.12 | −0.11 | −0.05 | −0.07 |
| Example 10 | −0.10 | −0.07 | −0.03 | −0.01 |
| Example 11 | −0.07 | −0.08 | −0.06 | −0.03 |

Table 6

| | Dimension of denture (Unit: mm) | | | | | |
|---|---|---|---|---|---|---|
| | Change in height of artificial teeth | | Vertical dimension of occlusion | Clearance between denture base and stone cast | | |
| | Maxillary | Mandibular | | Palatal middle | Ridge portion | Gingivobuccal hold |
| Example 8 | +0.002 | +0.03 | 0.12 | 0.10 | 0.00 | 0.00 |
| Example 9 | +0.11 | +0.09 | 0.19 | 0.16 | 0.03 | 0.00 |
| Example 10 | +0.12 | +0.10 | 0.21 | 0.14 | 0.02 | 0.00 |
| Example 11 | +0.03 | +0.04 | 0.10 | 0.06 | 0.00 | 0.00 |

What is claimed is:

1. A dental hydraulic investing material comprising (A) an aqueous polyvinyl alcohol solution, (B) a water-soluble metallic compound, (C) a water-soluble thermosetting resin precondensate and (D) a powdery filler-containing filler, wherein said investing material contains essentially no gypsum.

2. A dental hydraulic investing material according to claim 1, wherein the polyvinyl alcohol solution is a 5 to 50% by weight aqueous solution.

3. A dental hydraulic investing material according to claim 1, wherein the polyvinyl alcohol has a saponification degree of 50 to 100%.

4. A dental hydraulic investing material according to claim 1, wherein the polyvinyl alcohol has a saponification degree of 70 to 100%.

5. A dental hydraulic investing material according to claim 1, wherein the polyvinyl alcohol has a degree of polymerization of 200 or more.

6. A dental hydraulic investing material according to claim 1, wherein the polyvinyl alcohol has a degree of polymerization of 200 to 2,000.

7. A dental hydraulic investing material according to claim 1, wherein the water-soluble metallic compound (B) is at least one compound selected from the group consisting of sulfates, acetates, nitrates, halides, hydroxides and oxides of metals of Groups Ib, IIa, IIb, IIIa, IVa, IVb, Vb, VIb, VIIb and VIII of the Periodic Table.

8. A dental hydraulic investing material according to claim 1, wherein the water-soluble metallic compound is at least one member selected from the group consisting of copper sulfate, copper acetate, copper nitrate, copper chloride, beryllium sulfate, beryllium chloride, magnesium acetate, calcium acetate, strontium nitrate, zinc acetate, mercuric acetate, aluminum chloride, aluminum sulfate, stannous chloride, stannic chloride, lead acetate, titanium sulfate, zirconium oxychloride, vanadium trichloride, vanadium pentoxide, niobium chloride, chromous chloride, potassium perchromate, molybdenum oxide, manganese oxide, ferrous chloride, ferric chloride, ferric nitrate, cobaltous sulfate, cobalt acetate, nickel chloride, and nickel acetate.

9. A dental hydraulic investing material according to claim 1, wherein the water-soluble metallic compound is at least one member selected from the group consisting of copper acetate, aluminum chloride, aluminum sulfate, stannic chloride, titanium sulfate, molybdenum oxide, ferric chloride and potassium perchromate.

10. A dental hydraulic investing material according to claim 1, wherein the amount of the water-soluble metallic compound (B) is 1 metal atom per 2 to 1,000 hydroxyl groups in the polyvinyl alcohol (A).

11. A dental hydraulic investing material according to claim 1, wherein the amount of the water-soluble metallic compound is one metal atom per 10 to 500 hydroxyl groups of polyvinyl alcohol.

12. A dental hydraulic investing material according to claim 1, wherein the water-soluble metallic compound is a compound which can be water-solubilized with an acid or alkali.

13. A dental hydraulic investing material according to claim 1, wherein the water-soluble thermosetting resin precondensate is selected from the group consisting of the melamine-formaldehyde reaction products, urea-formaldehyde reaction products, phenol-formaldehyde reaction products and derivatives thereof.

14. A dental hydraulic investing material according to claim 13, wherein the molar ratio of melamine, urea or phenol to formaldehyde is $\frac{1}{2}$ to 1/20.

15. A dental hydraulic investing material according to claim 1, wherein the amount of the thermosetting resin precondensate (C) is 10 to 1000 parts by weight per 100 parts by weight of the polyvinyl alcohol.

16. A dental hydraulic investing material according to claim 1, wherein the amount of the thermosetting resin precondensate is 10 to 500 parts by weight per 100 parts by weight of polyvinyl alcohol.

17. A dental hydraulic investing material according to claim 1, wherein the filler (D) is a powdery filler.

18. A dental hydraulic investing material according to claim 1, wherein the filler is at least one member selected from the group consisting of aluminum hydroxide, calcium hydroxide, aluminum sulfate, barium sulfate, silica, magnesium silicate, aluminum silicate, calcium silicate, magnesium oxide, titanium oxide, zinc oxide, alumina white, silica-alumina, talc, clay, glass and quartz.

19. A dental hydraulic investing material according to claim 17, wherein the powdery filler has an average particle size of 50$\mu$ or less.

20. A dental hydraulic investing material according to claim 17, wherein the powdery filler is silica, silicate or a mixture thereof.

21. A dental hydraulic investing material according to claim 1, wherein the filler (D) is a mixture of a powdery filler and a fibrous filler.

22. A dental hydraulic investing material according to claim 1, wherein the amount of the filler (D) is 20 to 500 parts by weight per 100 parts by weight of the polyvinyl alcohol.

23. A dental hydraulic investing material of claim 2, wherein the water-soluble metallic compound (B) is aluminum chloride, ferric chloride or stannic chloride, the component (C) is a melamine-formaldehyde reaction product, and the filler (D) is silica powder having an average particle size of 50$\mu$ or less.

24. A method for preparing a dental hydraulic investing material, which comprises mixing (A) an aqueous solution of polyvinyl alcohol, (B) an aqueous solution of a water-soluble metallic compound, (C) an aqueous solution of a water-soluble thermosetting resin precondensate and (D) a powdery filler-containing filler.

25. A method according to claim 24, wherein the aqueous solution of polyvinyl alcohol (A) is mixed with an aqueous solution of aluminum chloride (B) and part of the powdery filler-containing filler (D), and the aqueous solution of the water-soluble thermosetting resin precondensate is separately mixed with the remaining part of the powdery filler-containing filler (D), and the resulting two dispersions are thereafter mixed with each other.

26. A method according to claim 24, wherein the polyvinyl alcohol solution is a 5 to 50% by weight aqueous solution of a polyvinyl alcohol having a saponification degree of 50 to 100% and a degree of polymerization of at least 200.

27. A method according to claim 24, wherein the water-soluble metallic compound (B) is at least one compound selected from the group consisting of sulfates, acetates, nitrates, halides, hydroxides and oxides of metals of Groups Ib, IIa, IIb, IIIa, IVa, IVb, Vb, VIb, VIIb and VIII of the Periodic Table.

28. A method according to claim 24, wherein the water-soluble thermosetting resin precondensate is selected from the group consisting of the melamine-formaldehyde reaction products, urea-formaldehyde reaction products, phenol-formaldehyde reaction products and derivatives thereof.

29. A dental hydraulic investment comprising:
(I) a layer of an investing material which comprises (A) an aqueous polyvinyl alcohol solution, (B) a water-soluble metallic compound, (C) a water-soluble thermosetting resin precondensate and (D) a powdery filler-containing filler, wherein said investing material contains essentially no gypsum; and
(II) a cover of gypsum on said layer.

30. A method according to claim 24, wherein the powdery filler is selected from the group consisting of aluminum hydroxide, calcium hydroxide, aluminum sulfate, barium sulfate, silica, magnesium silicate, aluminum silicate, calcium silicate, magnesium oxide, titanium oxide, zinc oxide, alumina white, silicate-alumina, talc, clay, glass and quartz, and fibrous filler is selected from the group consisting of cotton, flax, hemp, ramie, jute, wool, rayon, acetate fiber, polyamide fiber, polyvinyl alcohol fiber, polyvinylidene chloride fiber, polyacrylonitrile fiber, polyester fiber, polyethylene fiber, polypropylene fiber and glass fiber.

31. A method according to claim 30 wherein the powdery filler has an average particle size of 50$\mu$ or less and the fibrous filler has a length of 5 cm or less and a thickness of 150$\mu$ or less.

* * * * *